(12) United States Patent
Yamauchi

(10) Patent No.: US 11,566,727 B2
(45) Date of Patent: Jan. 31, 2023

(54) FLUID HANDLING DEVICE AND MANUFACTURING METHOD OF FLUID HANDLING DEVICE

(71) Applicant: Enplas Corporation, Saitama (JP)

(72) Inventor: Takumi Yamauchi, Saitama (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 17/474,195

(22) Filed: Sep. 14, 2021

(65) Prior Publication Data
US 2022/0082180 A1 Mar. 17, 2022

(30) Foreign Application Priority Data
Sep. 16, 2020 (JP) .............................. JP2020-155567

(51) Int. Cl.
*F16K 7/17* (2006.01)
*F16K 99/00* (2006.01)
*B01L 3/00* (2006.01)

(52) U.S. Cl.
CPC ..... *F16K 99/0015* (2013.01); *B01L 3/502738* (2013.01); *B01L 2300/0816* (2013.01); *B01L 2300/123* (2013.01); *B01L 2300/161* (2013.01); *B01L 2300/165* (2013.01); *B01L 2400/0655* (2013.01); *F16K 2099/008* (2013.01); *F16K 2099/0084* (2013.01)

(58) Field of Classification Search
CPC .......... F16K 99/0015; F16K 2099/008; F16K 2099/0084; B01L 2300/0816; B01L 2300/123; B01L 2300/161; B01L 2300/165; B01L 2400/0655; B01L 3/502738

USPC ................................ 251/331, 368; 137/833
See application file for complete search history.

(56) References Cited

U.S. PATENT DOCUMENTS

| | | | | |
|---|---|---|---|---|
| 5,863,502 | A * | 1/1999 | Southgate | B01L 3/502738 422/417 |
| 2004/0018523 | A1* | 1/2004 | Hawkins | B01L 3/5027 435/6.12 |
| 2004/0068019 | A1 | 4/2004 | Higuchi et al. | |
| 2004/0209354 | A1* | 10/2004 | Mathies | C12Q 1/689 422/68.1 |
| 2005/0133101 | A1* | 6/2005 | Chung | B01L 3/502738 137/833 |
| 2008/0008628 | A1* | 1/2008 | Park | B01L 3/502746 422/130 |
| 2011/0135546 | A1* | 6/2011 | Kurowski | B29C 66/723 422/502 |
| 2011/0240130 | A1* | 10/2011 | Den Dulk | B01F 33/451 251/65 |
| 2012/0126154 | A1* | 5/2012 | Den Dulk | F16K 99/0046 29/890.12 |

(Continued)

FOREIGN PATENT DOCUMENTS

WO WO 02/068104 9/2002

*Primary Examiner* — Minh Q Le

(57) ABSTRACT

A fluid handling device includes: an introduction part configured to introduce liquid; an ejection part configured to eject liquid; a channel including one end connected to the introduction part and another end connected to the ejection part; and a valve disposed at the channel. An inner surface of the introduction part has water-repellency, and an inner surface of the ejection part and at least a part of an inner surface of the channel do not have water-repellency.

4 Claims, 2 Drawing Sheets

(56) References Cited

U.S. PATENT DOCUMENTS

| | | | | |
|---|---|---|---|---|
| 2012/0177543 | A1* | 7/2012 | Battrell | F04B 43/043 |
| | | | | 422/187 |
| 2013/0251604 | A1* | 9/2013 | Kim | B01L 3/502738 |
| | | | | 422/504 |
| 2015/0204450 | A1* | 7/2015 | Tuccelli | F16K 7/06 |
| | | | | 137/563 |
| 2015/0352552 | A1* | 12/2015 | Levenberg | B01L 3/5027 |
| | | | | 435/309.1 |
| 2016/0199840 | A1* | 7/2016 | Tachibana | B01F 25/4314 |
| | | | | 435/6.12 |
| 2018/0126376 | A1* | 5/2018 | Larsen | C09D 5/00 |
| 2018/0221875 | A1* | 8/2018 | Glauser | B01L 3/502715 |
| 2018/0280974 | A1* | 10/2018 | Kazoe | B82B 3/0019 |
| 2018/0297029 | A1* | 10/2018 | Wang | B01L 3/502707 |
| 2019/0060897 | A1* | 2/2019 | Makino | G01N 21/64 |
| 2019/0275520 | A1* | 9/2019 | Stewart | C12M 35/04 |
| 2019/0344266 | A1* | 11/2019 | Megaridis | B01L 3/0289 |
| 2020/0163656 | A1* | 5/2020 | Velev | A61B 5/155 |
| 2020/0384469 | A1* | 12/2020 | Kvist | B01F 23/4144 |
| 2021/0017573 | A1* | 1/2021 | Bordy | B01L 3/502715 |
| 2021/0299652 | A1* | 9/2021 | Yamauchi | B01L 3/502776 |
| 2021/0394185 | A1* | 12/2021 | Goto | B01L 7/52 |

\* cited by examiner

FLUID HANDLING DEVICE AND MANUFACTURING METHOD OF FLUID HANDLING DEVICE

CROSS REFERENCE TO RELATED APPLICATIONS

This application is entitled to the benefit of Japanese Patent Application No. 2020-155567, filed on Sep. 16, 2020, the disclosure of which including the specification, drawings and abstract is incorporated herein by reference in its entirety.

TECHNICAL FIELD

The present invention relates to a fluid handling device and a manufacturing method of the fluid handling device.

BACKGROUND ART

In recent years, fluid handling devices have been used to analyze trace amounts of substances such as proteins and nucleic acids with high accuracy and speed. Fluid handling devices have the advantage of requiring only a small amount of reagent and sample for analysis, and are expected to be used in a variety of applications such as clinical, food, and environmental testing. Fluid handling devices are known to have a plurality of micro channels and to be able to analyze small amounts of samples (see, for example, PTL 1).

PTL 1 discloses a micro channel device (fluid handling device) including a channel entrance serving as an entrance of fluid, a channel outlet serving as an outlet of fluid, a micro channel connecting the channel entrance and the channel outlet. In the micro channel device disclosed in PTL 1, liquid is introduced from the channel entrance, and the liquid is ejected from the channel outlet.

CITATION LIST

Patent Literature

PTL 1
WO2002/068104

SUMMARY OF INVENTION

Technical Problem

However, in the micro channel device disclosed in PTL 1, a predetermined amount of liquid may not be fed, or bubbles may mix in liquid to be fed due to liquid remaining at the inner surface of the channel entrance. In view of this, to prevent liquid from remaining at the inner surface of the channel entrance, it is conceivable to provide a water-repellent treatment at the inner surface of the channel entrance. For example, it is conceivable to provide a water-repellent treatment to the inner surface of the channel entrance by feeding a liquid water-repellent agent from the channel entrance and then ejecting the water-repellent agent from the channel outlet after performing water-repellent treatment. At this time, the water-repellent treatment is entirely provided not only at the inner surface of the channel entrance, but also at the inner surface of the micro channel. When the water-repellent treatment is provided at the entire inner surface of the micro channel, the organic solvent included in the water-repellent agent remaining in the micro channel increases, and a desired analysis may not be appropriately performed. In addition, the cost of the water-repellent treatment increases.

In view of this, an object of the present invention is to provide a fluid handling device in which liquid less remains in the introduction part, and the water-repellent treatment is not provided at least in a part of the channel. In addition, another object of the present invention is to provide a manufacturing method of a fluid handling device in which liquid less remains in the introduction part, and the water-repellent treatment is not provided at least in a part of the channel.

Solution to Problem

A fluid handling device according to an embodiment of the present invention includes: an introduction part configured to introduce liquid; an ejection part configured to eject liquid; a channel including one end connected to the introduction part and another end connected to the ejection part; and a valve disposed at the channel. An inner surface of the introduction part has water-repellency, and an inner surface of the ejection part and at least a part of an inner surface of the channel do not have water-repellency.

A method of manufacturing a fluid handling device according to an embodiment of the present invention, the method including: preparing the fluid handling device, the fluid handling device including an introduction part configured to introduce liquid, an ejection part configured to eject liquid, a channel including one end connected to the introduction part and another end connected to the ejection part, and a valve disposed at the channel; and performing a water-repellent treatment using a water-repellent agent on an inner surface of the introduction part by introducing the water-repellent agent from the introduction part with the valve closed.

Advantageous Effects of Invention

Since liquid less remains in the introduction part and the water-repellent treatment is not provided at least in a part of the channel, the fluid handling device of an embodiment of the present invention is capable of analyzing trace amounts of substances with high accuracy and speed.

DESCRIPTION OF EMBODIMENTS

A fluid handling device and a manufacturing method of the fluid handling device according to an embodiment of the present invention are elaborated below with reference to the accompanying drawings.

Configuration of Fluid Handling Device

Figure 1A:
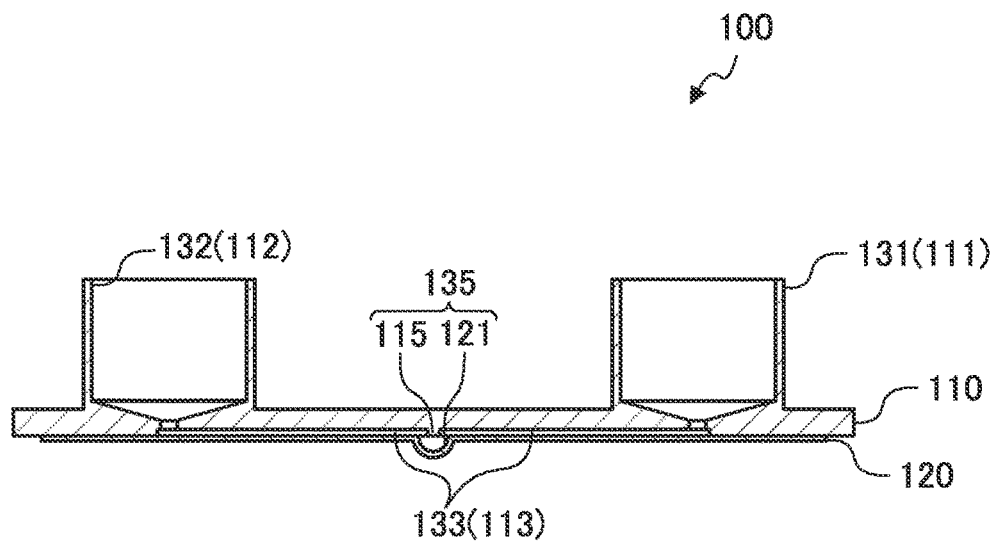
FIGS. 1A, 1B and 1C illustrate a configuration of a fluid handling device according to an embodiment of the present invention.
Figures 1B, 1C:
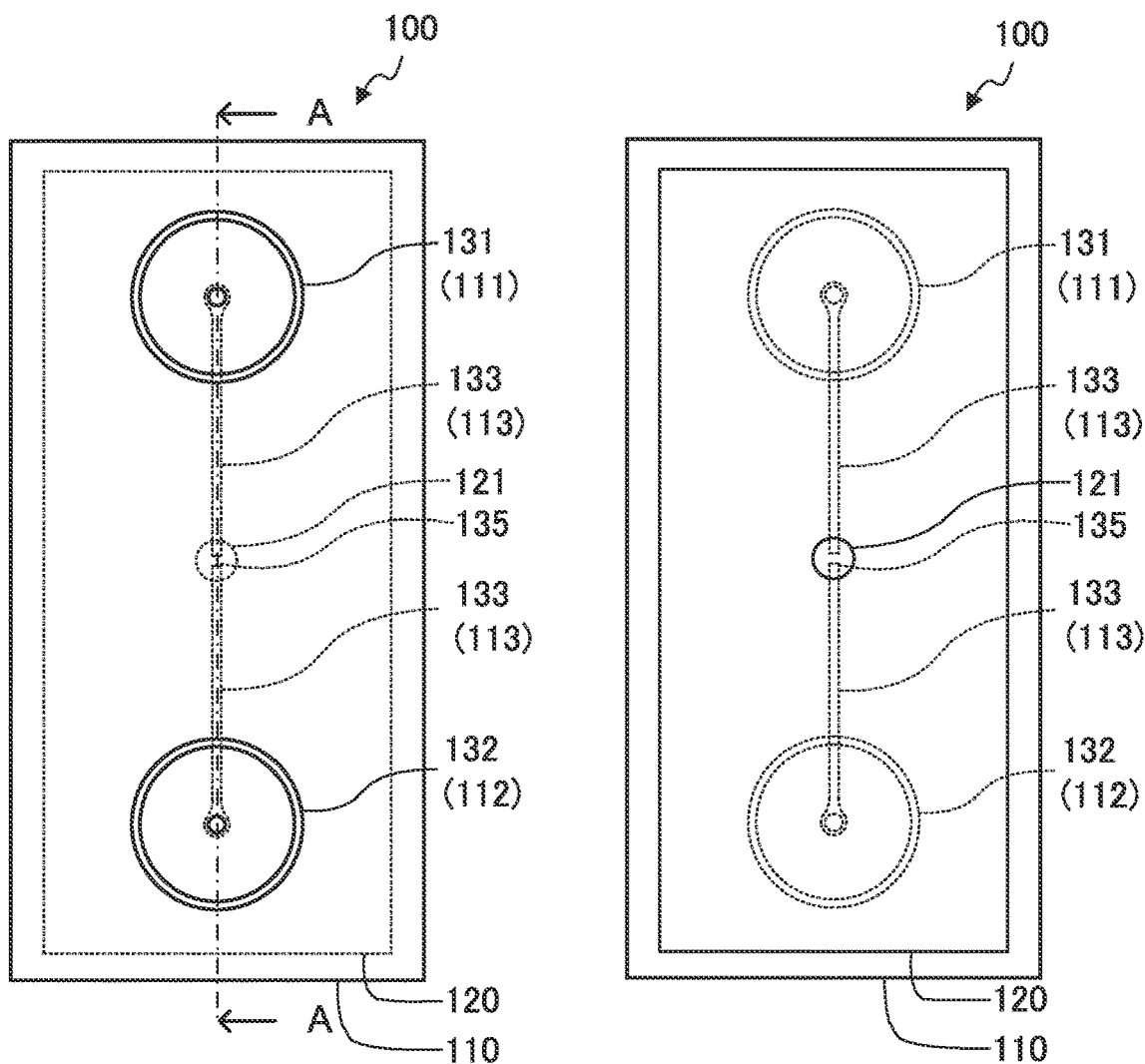

FIGS. 1A to 1C are schematic views illustrating a configuration of a fluid handling device according to the embodiment of the present invention. FIG. 1A is a sectional view taken along line A-A of FIG. 1B, FIG. 1B is a plan view, and FIG. 1C is a bottom view.

As illustrated in FIGS. 1A to 1C, fluid handling device 100 is composed of substrate 110 and film 120, and film 120 is joined on one surface of substrate 110. The region surrounded by film 120 and substrate 110 is channel 133 for carrying fluid. Fluid handling device 100 includes introduction part 131, ejection part 132, channel 133, and valve 135. Examples of the fluid include reagent, liquid samples, gas, and powder.

Substrate 110 is a substantially rectangular transparent resin substrate. The thickness of substrate 110 is not limited. The thickness of substrate 110 including introduction part 131 is, for example, 1 mm to 10 mm inclusive. The material of substrate 110 is not limited, and may be appropriately selected from publicly known resins and glass. Examples of the material of substrate 110 include polyethylene terephthalate, polycarbonate, polymethylmethacrylate, chloride vinyl, polypropylene, polyether, polyethylene, cycloolefin polymer and cycloolefin copolymer.

In substrate 110, a channel groove and a plurality of through holes are formed. In substrate 110, first through hole 111, second through hole 112, and channel groove 113 are formed. Film 120 is joined on the surface in which channel groove 113 is formed. When film 120 is joined to substrate 110, first through hole 111 serves as introduction part 131, second through hole 112 serves as ejection part 132, and channel groove 113 serves as channel 133. Note that the number of channel grooves 113 and the number of through holes are not limited, and may be appropriately set in accordance with the analysis.

Film 120 is a substantially rectangular transparent resin film. Film 120 includes diaphragm part 121 that protrudes to the side opposite to substrate 110 when it is joined to substrate 110. The thickness of film 120 is, for example, 30 μm to 300 μm inclusive. In addition, the material of film 120 is not limited. The material of film 120 may be appropriately selected from publicly known resins. Examples of the material of film 120 include polyethylene terephthalate, polycarbonate, polymethylmethacrylate, chloride vinyl, polypropylene, polyether, polyethylene and, cycloolefin polymer, and cycloolefin copolymer. Film 120 is joined to substrate 110 by thermo compression bonding, laser welding, an adhesive agent and the like, for example.

Introduction part 131 is a bottomed recess connected to one end of channel 133 and is open to the outside. One end of channel 133 is open at the bottom surface of the recess. Introduction part 131 is composed of first through hole 111 formed in substrate 110, and film 120 closing one opening of first through hole 111. The size of introduction part 131 is not limited, and may be appropriately designed as necessary. In the present embodiment, introduction part 131 has a substantially columnar shape. The bottom surface (end portion on first channel 133 side) of introduction part 131 has a tapered shape. That is, preferably, the bottom surface of introduction part 131 is formed such that the cross-sectional area decreases toward channel 133. In addition, in the present embodiment, the internal diameter of introduction part 131 is about 2 mm.

The inner surface of introduction part 131 has water-repellency. Here, the water-repellency is defined by the contact angle, for example. The water-repellency means that the contact angle to pure water such as Reverse Osmosis (RO) water, deionized water, distillation water, and purification water is 90° or greater. In the present embodiment, the contact angle is 90° or greater, more preferably 110° or greater, still more preferably 150° or greater. In addition, the condition for being not water-repellent is that the contact angle is smaller than 90°.

To provide the water-repellency, a hydrophobic material as a coating may be provided at the inner surface of introduction part 131, for example. Examples of the coating include fluorine coating. Examples of the water-repellent agent for forming the coating include FLUOROSURF (registered trademark) (FluoroTechnology Co., LTD.), and HIREC (registered trademark) (NTT Advanced technology corporation). Examples of the coating method include dipping and plasma treatment.

Channel 133 is a channel that connects between introduction part 131 and ejection part 132. One end of channel 133 is connected to introduction part 131, and ejection part 132 is disposed at the other end of first channel 133. Channel 133 is composed of channel groove 113 formed in substrate 110, and film 120 closing channel groove 113. The structure of channel 133 is not limited as long as liquid can be appropriately carried. The cross-sectional shape of channel 133 is not limited, and may be any shapes such as a semicircular shape, a rectangular shape and a circular shape. The cross-sectional size of channel 133 is also not limited. The cross-sectional shape of channel 133 is, for example, a substantially rectangular shape whose one side has a length (width and depth) of about several tens of micrometers. The cross-sectional area of channel 133 in the fluid flow direction may be or may not be constant. In the present embodiment, the cross-sectional area of channel 133 is constant from the upstream end to downstream end of channel 133. At least a part of the inner surface of channel 133 does not have water-repellency.

Valve 135 is disposed at channel 133. Valve 135 may be disposed at a center portion of channel 133, or at an end portion of channel 133 on introduction part 131 side. In the present embodiment, valve 135 is disposed at a center portion of channel 133. The configuration of valve 135 is not limited as long as channel 133 can be connected and blocked. In the present embodiment, valve 135 includes partition wall 115 and diaphragm part 121. Partition wall 115 is disposed inside channel 133. Partition wall 15 is a wall that partitions channel groove 113. Diaphragm part 121 is a part of film 120 and is disposed opposite to partition wall 115. The shape of diaphragm part 121 in plan view is, but not limited thereto, a circular shape, for example. In addition, diaphragm part 121 has a shape protruding to the side opposite to substrate 110. In the state where valve 135 is closed, partition wall 115 and diaphragm part 121 are spaced away from each other, and channel 133 is in communication. In the state where valve 135 is open, partition wall 115 and diaphragm part 121 are in intimate contact with each other, and channel 133 is blocked.

Ejection part 132 is a bottomed recess connected to the other end of channel 133, and is open to the outside. The other end of channel 133 is open at the bottom surface of the recess. Ejection part 132 is composed of second through hole 112 formed in substrate 110 and film 120 closing one opening of second through hole 112. The size of ejection part 132 is not limited, and may be appropriately designed as necessary. In the present embodiment, ejection part 132 has a substantially columnar shape. The shape of the bottom surface of ejection part 132 is, but not limited thereto, a tapered shape in the present embodiment. In addition, in the present embodiment, ejection part 132 has an internal diameter of about 2 mm. The inner surface of ejection part 132 does not have water-repellency.

Manufacturing Method of Fluid Handling Device

Figure 2A:
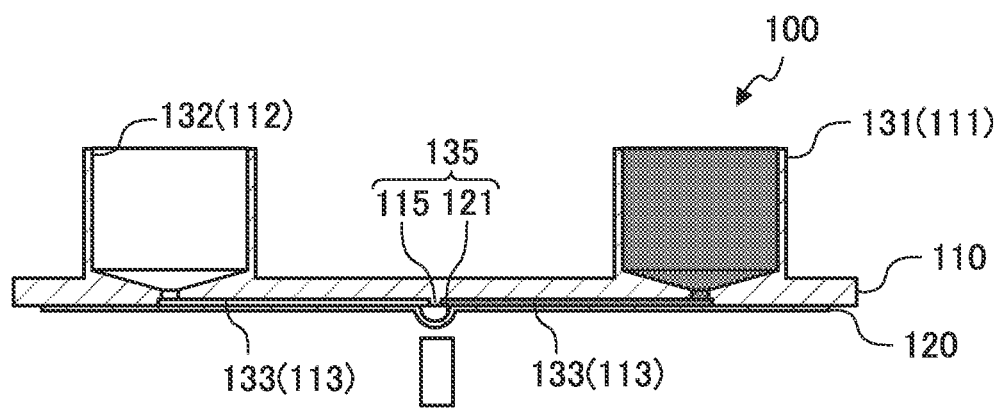
FIGS. 2A, 2B and 2C are diagrams for describing a manufacturing method of the fluid handling device according to the embodiment of the present invention.
Figure 2B:
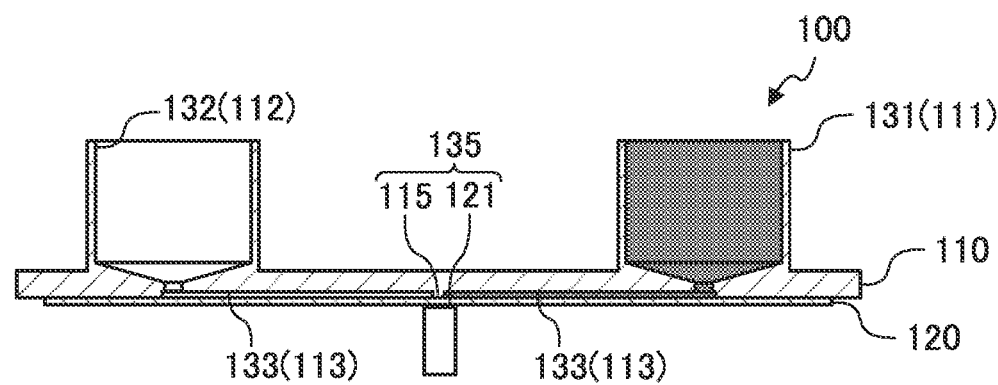
Figure 2C:
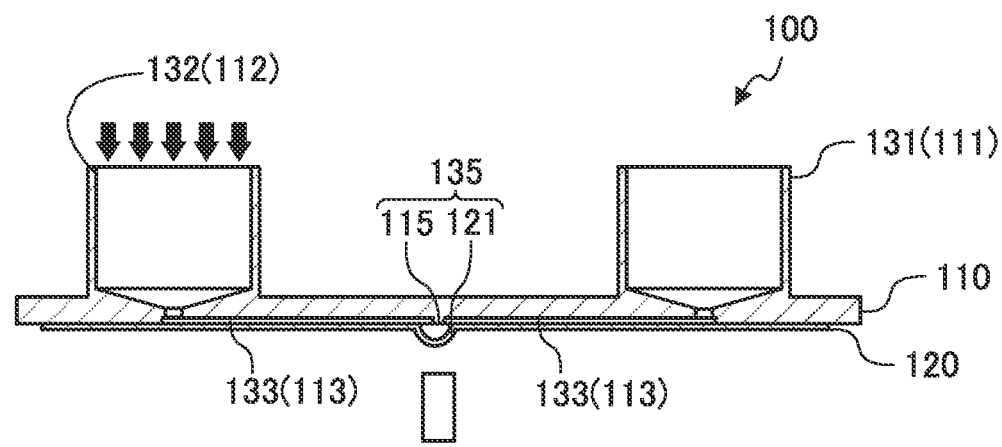

Now, a manufacturing method of fluid handling device 100 is described. FIGS. 2A to 2C are diagrams for describing a manufacturing method of fluid handling device 100. The manufacturing method of fluid handling device 100 includes a step of preparing fluid handling device 100, a step of performing a water-repellent treatment, and a step of removing a water-repellent agent. Note that here, a manufacturing method of fluid handling device 100 including a step of performing a water-repellent treatment through application of a coating agent is described.

In the step of preparing fluid handling device 100, fluid handling device 100 including the above-described introduction part 131, ejection part 132 for ejecting liquid, channel 133 with one end connected to introduction part 131 and the other end connected to ejection part 132, and valve 135 disposed at channel 133 is prepared. Fluid handling device 100 may be prepared as a commercially available product or may be prepared by manufacturing it.

As illustrated in FIG. 2A and FIG. 2B, in the step of performing a water-repellent treatment, a water-repellent treatment is provided on the inner surface of introduction part 131. In the present embodiment, since valve 135 is disposed at a center portion of channel 133, a water-repellent treatment is provided on the inner surface of introduction part 131 and a part of the inner surface of channel 133. To be more specific, the water-repellent treatment is provided by introducing the water-repellent agent from introduction part 131 with putting valve 135 "closed". Here, examples of the water-repellent treatment method include a plasma treatment and a method of applying a coating agent.

In the method of applying a coating agent, the water-repellent agent is introduced from introduction part 131. The water-repellent agent introduced from introduction part 131 advances from the upstream toward downstream of channel 133. When the water-repellent agent reaches valve 135, valve 135 is closed. At this time, since valve 135 is closed, the water-repellent agent is introduced to introduction part 131 and the upstream side in channel 133 from introduction part 131. In this state, it is left for a predetermined time at a predetermined temperature. In this manner, the water-repellent treatment is provided on introduction part 131 and the upstream inner surface of the inner surface of channel 133. At this time, the inner surface of introduction part 131 and the downstream inner surface of channel 133 are not brought into contact with the water-repellent agent and thus are not provided with the water-repellent treatment.

As illustrated in FIG. 2C, in the step of removing the water-repellent agent, the water-repellent agent in introduction part 131 and the upstream side in channel 133 is removed. In the method of removing the water-repellent agent, the water-repellent agent is removed from introduction part 131 side by setting the inside of introduction part 131 to a negative pressure or setting the inside of ejection part 132 to a positive pressure, in the state where valve 135 is open and channel 133 is in communication. In the present embodiment, the water-repellent agent is removed from introduction part 131 side by setting the inside of ejection part 132 to a positive pressure in the state where valve 135 is open and channel 133 is in communication.

Note that when the water-repellent treatment is performed through plasma treatment, fluid handling device 100 is disposed in the plasma treatment chamber in the state where the opening of ejection part 132 is sealed with a seal and the like and valve 135 is closed. Then, the plasma treatment chamber is filled with a water-repellent agent that generates fluorinated plasma. At this time, since the opening of ejection part 132 is sealed and valve 135 is closed, the water-repellent agent is introduced to introduction part 131 and the upstream side in channel 133 from introduction part 131. By generating fluorinated plasma in this state, the water-repellent treatment is provided on the inner surface of introduction part 131 and the upstream inner surface of channel 133. At this time, the inner surface of introduction part 131 and the downstream inner surface of channel 133 are not brought into contact with the water-repellent agent and thus are not provided with the water-repellent treatment. Finally, ejection part 132 and valve 135 are exposed to the atmosphere, and the process is completed.

Note that in the state where valve 135 is disposed at an upstream end of channel 133, the water-repellent treatment is not provided at channel 133.

In this manner, in the present embodiment, analysis can be appropriately performed with no liquid remaining at the inner surface of introduction part 131.

Effect

As described above, according to the present invention, the inner surface of the introduction part has water-repellency, and thus samples can be appropriately analyzed without liquid remaining at the inner surface of the introduction part. In addition, the inner surface of ejection part 132 and the downstream inner surface of channel 133 do not have water-repellency, and thus desired analysis can be appropriately performed even when organic solvent remains.

INDUSTRIAL APPLICABILITY

The fluid handling device of the embodiment of the present invention is applicable to, for example, laboratory tests, food tests, environment tests and the like.

REFERENCE SIGNS LIST

100 Fluid handling device
110 Substrate
111 First through hole
112 Second through hole
113 First channel groove
114 Second channel groove
115 Partition wall
120 Film
121 Diaphragm part
131 Introduction part
132 Ejection part
133 Channel
135 Valve

The invention claimed is:

1. A fluid handling device comprising:
    an introduction part configured to introduce liquid;
    an ejection part configured to eject liquid;
    a channel including one end connected to the introduction part and another end connected to the ejection part; and
    a valve disposed at the channel,
    wherein an inner surface of the introduction part has water-repellency, and
    wherein an inner surface of the ejection part and at least a part of an inner surface of the channel do not have water-repellency.

2. The fluid handling device according to claim 1, wherein a bottom surface of the introduction part has a tapered shape.

3. A method of manufacturing a fluid handling device, the method comprising:
    preparing the fluid handling device, the fluid handling device including an introduction part configured to introduce liquid, an ejection part configured to eject liquid, a channel including one end connected to the introduction part and another end connected to the ejection part, and a valve disposed at the channel; and performing a water-repellent treatment using a water-repellent agent on an inner surface of the introduction part by introducing the water-repellent agent from the introduction part with the valve closed.

4. The method according to claim 3, further comprising a step of removing the water-repellent agent from the introduction part in a state where inside of the introduction part is set to a negative pressure or inside of the ejection part is set to a positive pressure, with the valve open.

* * * * *